US010015596B1

(12) United States Patent
Claywell et al.

(10) Patent No.: US 10,015,596 B1
(45) Date of Patent: Jul. 3, 2018

(54) ENGINE SOUND AUDIO CONTROL SYSTEMS AND METHODS BASED ON INTAKE AND/OR EXHAUST TEMPERATURE

(71) Applicant: GM Global Technology Operations LLC, Detroit, MI (US)

(72) Inventors: Mark R. Claywell, Birmingham, MI (US); Maqsood Rizwan Ali Khan, Rochester Hills, MI (US); Scott M. Reilly, Southfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/464,832

(22) Filed: Mar. 21, 2017

(51) Int. Cl.
*H04B 1/00* (2006.01)
*H04R 3/12* (2006.01)
*F02D 41/00* (2006.01)

(52) U.S. Cl.
CPC .......... *H04R 3/12* (2013.01); *F02D 41/0097* (2013.01); *F02D 2200/025* (2013.01); *F02D 2200/0414* (2013.01); *F02D 2200/1002* (2013.01); *H04R 2499/13* (2013.01)

(58) Field of Classification Search
CPC ...... H04R 2499/13; H04R 3/04; H03G 5/165; G10K 11/002; G10K 2210/1282
USPC ................................ 381/94.3, 86, 102, 103
See application file for complete search history.

(56) References Cited

U.S. PATENT DOCUMENTS 8,855,894 B2 10/2014 Hamama et al.
9,830,902 B1 * 11/2017 Terashima ......... G10K 11/1786
2004/0156511 A1 * 8/2004 Vaishya ............. G10K 11/1782 381/71.8
2014/0334633 A1 * 11/2014 Krueger ............... F02M 35/125 381/71.4
2015/0159527 A1 * 6/2015 Nording ................. B60K 13/04 181/206

* cited by examiner

*Primary Examiner* — Alexander Jamal

(57) ABSTRACT

An audio control system of a vehicle includes a sound control module configured to determine N magnitudes for outputting a predetermined engine sound at N frequencies, respectively, where N is an integer greater than one. A magnitude adjustment module is configured to determine at least one N magnitude adjustment values for the N frequencies, respectively, based on at least one of: an intake air temperature; and an exhaust temperature. The sound control module is further configured to determine N adjusted magnitudes for the predetermined engine sound at the N frequencies based on: the N magnitudes for the N frequencies, respectively; and the N magnitude adjustment values for the N frequencies, respectively. An audio driver module is configured to apply power to at least one speaker of the vehicle and output the predetermined engine sound at the N frequencies and the N adjusted magnitudes for the N frequencies, respectively.

18 Claims, 3 Drawing Sheets

ENGINE SOUND AUDIO CONTROL SYSTEMS AND METHODS BASED ON INTAKE AND/OR EXHAUST TEMPERATURE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to audio systems of vehicles and more particularly to systems and methods for outputting engine sound via audio systems of vehicles based on at least one of intake temperature and exhaust temperature.

Some vehicles include conventional powertrains having an internal combustion engine and a drivetrain that normally emit sounds during vehicle operation. Many consumers have come to rely on these normal sounds as a sign of proper vehicle function. Changes in these normal sounds may indicate, to certain consumers, that the internal combustion engine and/or the drivetrain may be functioning differently than expected.

Some consumers may have expectations as to what the normal sounds of different types of vehicle should be. For example, a consumer may expect certain sounds from "high performance" vehicles, while some sounds may not be expected from other types of vehicles. An absence of expected sounds may detract from a user's enjoyment of a vehicle. Presence of unexpected vehicle sounds, such as sound produced by one or more powertrain components, may also detract from a user's enjoyment of a vehicle.

SUMMARY

In a feature, an audio control system of a vehicle is described. A sound control module is configured to determine N magnitudes for outputting a predetermined engine sound at N frequencies, respectively, where N is an integer greater than one. A magnitude adjustment module is configured to determine at least one N magnitude adjustment values for the N frequencies, respectively, based on at least one of: an intake air temperature; and an exhaust temperature. The sound control module is further configured to determine N adjusted magnitudes for the predetermined engine sound at the N frequencies based on: the N magnitudes for the N frequencies, respectively; and the N magnitude adjustment values for the N frequencies, respectively. An audio driver module is configured to apply power to at least one speaker of the vehicle and output the predetermined engine sound at the N frequencies and the N adjusted magnitudes for the N frequencies, respectively.

In further features, an adjustment module is configured to at least one of: determine a first adjustment value based on the intake air temperature and a predetermined intake air temperature; and determine a second adjustment value based on the exhaust temperature and a predetermined exhaust temperature. An adjusting module is configured to at least one of: determine a first adjusted engine speed based on an engine speed and the first adjustment value; and determine a second adjusted engine speed based on the engine speed and the second adjustment value. The magnitude adjustment module is configured to determine at least one of the N magnitude adjustment values for the N frequencies, respectively, based on at least one of: the first adjusted engine speed; and the second adjusted engine speed. The sound control module is configured to determine the N magnitudes for the N frequencies, respectively, using a lookup table calibrated based on at least one of the predetermined intake air temperature and the predetermined exhaust temperature.

In further features, the sound control module is configured to determine the N magnitudes for the N frequencies, respectively, based on an engine torque output and using the lookup table. The lookup table includes magnitudes for N predetermined orders, respectively, of a base frequency indexed as a function of engine torque output.

In further features, the base frequency is a predetermined fundamental frequency of the engine.

In further features, the sound control module is configured to set the N adjusted magnitudes for the N frequencies based on sums of: the N magnitudes for the N frequencies, respectively; and the N magnitude adjustment values for the N frequencies, respectively.

In further features, the adjusting module is configured to at least one of: set the first adjusted engine speed based on the engine speed multiplied by the first adjustment value; and set the second adjusted engine speed based on the engine speed multiplied by the second adjustment value.

In further features, the sound control module is configured to determine the N magnitudes for the N frequencies, respectively, based on a torque output of the engine.

In further features, the N frequencies include N predetermined orders of a predetermined fundamental frequency of the engine.

In further features, the magnitude adjustment module is configured to determine the N magnitude adjustment values for the N frequencies, respectively, based on at least one of: (i) a first ratio of the intake air temperature to a predetermined intake air temperature; and (ii) a second ratio of the exhaust temperature to a predetermined exhaust temperature.

In further features, the sound control module is configured to determine the N magnitudes for the N frequencies, respectively, using a lookup table calibrated based on at least one of the predetermined intake air temperature and the predetermined exhaust temperature.

In a feature, an audio control method for a vehicle includes: determining N magnitudes for outputting a predetermined engine sound at N frequencies, respectively, where N is an integer greater than one; determining at least one N magnitude adjustment values for the N frequencies, respectively, based on at least one of: an intake air temperature; and an exhaust temperature; determining N adjusted magnitudes for the predetermined engine sound at the N frequencies based on: the N magnitudes for the N frequencies, respectively; and the N magnitude adjustment values for the N frequencies, respectively; and applying power to at least one speaker of the vehicle and outputting the predetermined engine sound at the N frequencies and the N adjusted magnitudes for the N frequencies, respectively.

In further features, the audio control method further includes: determining a first adjustment value based on the intake air temperature and a predetermined intake air temperature; determining a second adjustment value based on the exhaust temperature and a predetermined exhaust temperature; determining a first adjusted engine speed based on an engine speed and the first adjustment value; and determining a second adjusted engine speed based on the engine speed and the second adjustment value; where determining the N magnitude adjustment values includes determining at least one of the N magnitude adjustment values for the N frequencies, respectively, based on at least one of: the first adjusted engine speed; and the second adjusted engine speed; and where determining the N magnitudes includes determining the N magnitudes for the N frequencies, respectively, using a lookup table calibrated based on at least one of the predetermined intake air temperature and the predetermined exhaust temperature.

In further features: determining the N magnitudes includes determining the N magnitudes for the N frequencies, respectively, based on an engine torque output and using the lookup table; and the lookup table includes magnitudes for N predetermined orders, respectively, of a base frequency indexed as a function of engine torque output.

In further features, the base frequency is a predetermined fundamental frequency of the engine.

In further features, determining the N adjusted magnitudes includes setting the N adjusted magnitudes for the N frequencies based on sums of: the N magnitudes for the N frequencies, respectively; and the N magnitude adjustment values for the N frequencies, respectively.

In further features, at least one of: determining the first adjusted engine speed includes setting the first adjusted engine speed based on the engine speed multiplied by the first adjustment value; and determining the second adjusted engine speed includes setting the second adjusted engine speed based on the engine speed multiplied by the second adjustment value.

In further features, determining the N magnitudes includes determining the N magnitudes for the N frequencies, respectively, based on a torque output of the engine.

In further features, the N frequencies include N predetermined orders of a predetermined fundamental frequency of the engine.

In further features, determining the N magnitude adjustment values includes determining the N magnitude adjustment values for the N frequencies, respectively, based on at least one of: (i) a first ratio of the intake air temperature to a predetermined intake air temperature; and (ii) a second ratio of the exhaust temperature to a predetermined exhaust temperature.

In further features, determining the N magnitudes includes determining the N magnitudes for the N frequencies, respectively, using a lookup table calibrated based on at least one of the predetermined intake air temperature and the predetermined exhaust temperature.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Internal combustion engines of vehicles combust air and fuel within cylinders. An engine control module (ECM) controls engine actuators, for example, based on a driver torque request. A vehicle may also include one or more motor generator units (MGUs) that can be used to perform different functions at different times. For example, an MGU can be used (i) to output torque to a powertrain of the vehicle and (ii) to impose a load on the powertrain of the vehicle to convert mechanical energy into electrical energy, for example, for regeneration.

An audio control module outputs engine sound via one or more speakers of the vehicle to enhance sound produced by the engine. The audio control module may also output masking sound via the one or more speakers to mask and/or attenuate one or more other sounds.

The audio control module sets frequencies and magnitudes for outputting an engine sound based on engine speed and engine torque. The audio control module sets the frequencies and magnitudes using predetermined data calibrated for outputting engine sound. However, one or more engine operating conditions may vary from operating conditions during the calibration of the predetermined data. For example, intake temperature and/or exhaust temperature may vary from intake and exhaust temperature conditions during calibration of the predetermined data. Actual sound produced by the engine may vary as intake and/or exhaust temperature changes.

According to the present disclosure, the audio control module adjusts engine sound output based on intake temperature and/or exhaust temperature relative to a predetermined intake temperature and/or a predetermined exhaust temperature present during the calibration. For example, the audio control module may adjust one or more of the magnitudes for outputting engine sound. Adjusting engine sound output via the speakers based on intake temperature and/or exhaust temperature may compensate for sound speed in the intake and/or exhaust system. The engine sound output by audio control module may therefore enhance aural experience within the passenger cabin of the vehicle.

Figure 1:
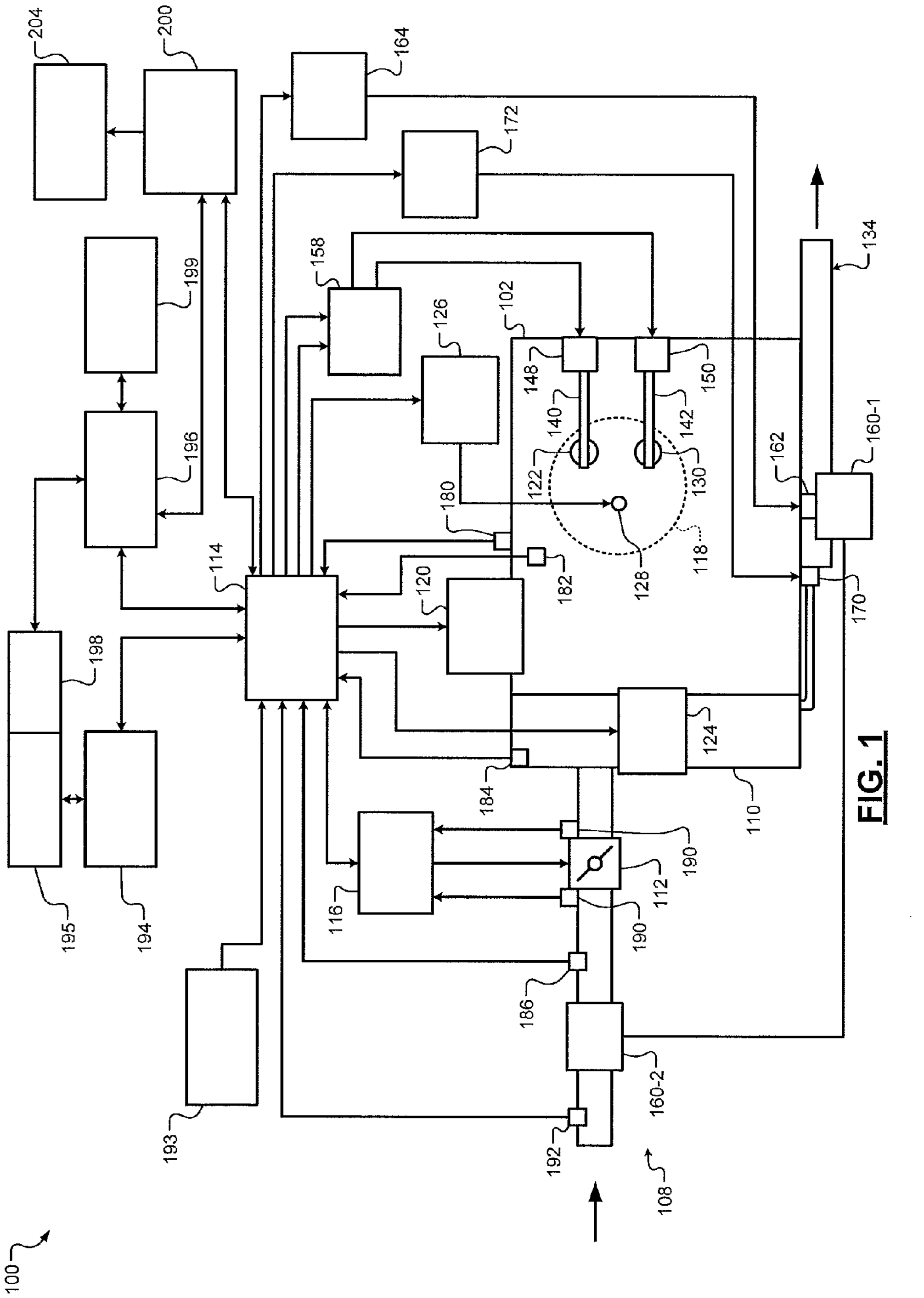
FIG. 1 is a functional block diagram including an example powertrain system of a vehicle.

Referring now to FIG. 1, a functional block diagram of an example powertrain system 100 is presented. The powertrain system 100 of a vehicle includes an engine 102 that combusts an air/fuel mixture to produce torque. The vehicle may be non-autonomous or autonomous.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192.

One or more other sensors 193 may also be implemented. For example, an exhaust temperature sensor may measure a temperature of exhaust within an exhaust manifold that receives exhaust gas output from the cylinders. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and a motor generator unit (MGU) 198. While the example of one MGU is provided, multiple MGUs and/or electric motors may be implemented. The terms MGU and electric motor may be interchangeable herein. In various implementations, various functions of the ECM 114, the transmission control module 194, and the hybrid control module 196 may be integrated into one or more modules.

Each system of the engine 102 that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the MGU 198 to output torque, for example, to supplement engine torque output. For example, the hybrid control module 196 may control the MGU 198 to output (positive) torque when the torque request is greater than a predetermined torque, when the APP is greater than a predetermined position, or when the driver is rapidly depressing the accelerator pedal. The predetermined torque may be calibrated and may be, for example, at least a predetermined fraction of a maximum possible torque output of the engine 102 under the present operating conditions. The predetermined fraction may be calibratable, is greater than zero, and may be, for example, approximately 80 percent, approximately 90 percent, or another suitable value that is greater than 50 percent of the maximum possible torque output of the engine 102.

The hybrid control module 196 applies electrical power from a battery 199 to the MGU 198 to cause the MGU 198 to output positive torque. While the example of the battery 199 is provided, more than one battery may be used to supply power to the MGU 198. The MGU 198 may output torque, for example, to the engine 102, to an input shaft of the transmission 195, to an output shaft of the transmission 195, or to another torque transfer device of the powertrain of the vehicle. The battery 199 may be dedicated for the MGU 198 and one or more other batteries may supply power for other vehicle functions.

Under other circumstances, the hybrid control module 196 may control the MGU 198 to convert mechanical energy of the vehicle into electrical energy. The hybrid control module 196 may control the MGU 198 to convert mechanical energy into electrical energy, for example, to recharge the battery 199. This may be referred to as regeneration.

The vehicle also includes an audio control module 200 that controls sound output via speakers 204. The speakers 204 may be located and output sound to within the passenger cabin of the vehicle. However, one or more of the speakers 204 may be implemented at another location, such as in the exhaust system 134. The audio control module 200 may control the speakers 204 to output sound based on received amplitude modulation (AM) signals, received frequency modulation (FM) signals, received satellite signals, and other types of audio signals. The audio control module 200 may be implemented, for example, with an infotainment system.

Under some circumstances, the audio control module 200 additionally or alternatively control the sound output via the speakers 204 to generate engine sound. The audio control module 200 may generate engine sound via the speakers 204, for example, to enhance sound output by the engine 102. The audio control module 200 may also generate sound, for example, to mask various vehicle sounds.

The audio control module 200 may receive parameters from the ECM 114, the hybrid control module 196, the transmission control module 194, and/or one or more other control modules of the vehicle. The audio control module 200 may receive parameters from other modules, for example, via a car area network (CAN) bus or another type of network. As discussed further below, the audio control module 200 may determine when and the extent to which to output engine sound based on one or more of the received parameters.

Figure 2:
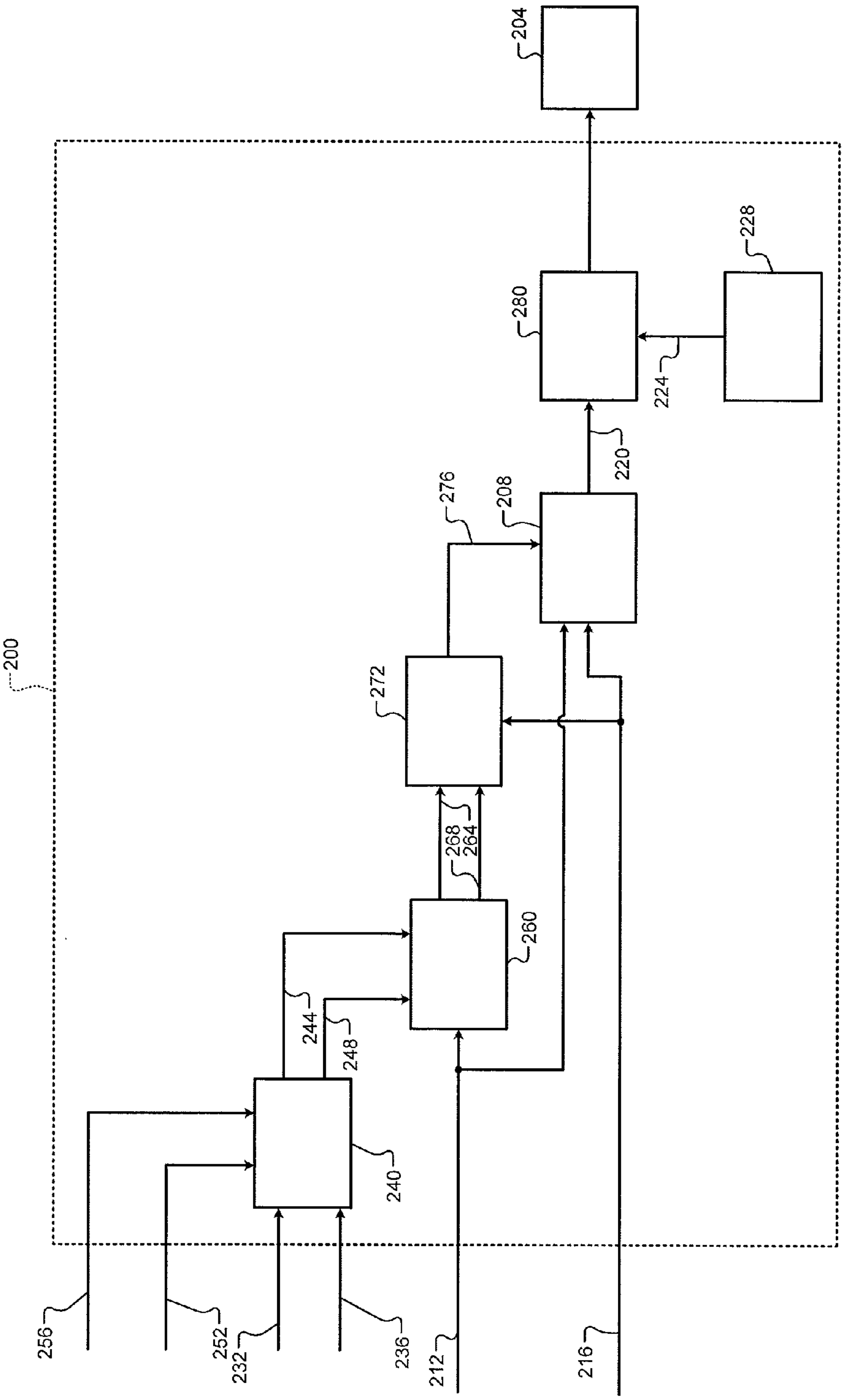
FIG. 2 is a functional block diagram including an example audio control module and speakers.

FIG. 2 is a functional block diagram of an example audio system including the audio control module 200 and the speakers 204. The speakers 204 output sound within the passenger cabin of the vehicle and/or at one or more other locations of the vehicle, such as at the exhaust system 134 of the vehicle.

A sound control module 208 determines how to output engine sound via the speakers 204 based on an engine speed 212 and an engine torque 216. More specifically, the sound control module 208 sets characteristics 220 of one or more predetermined engine sounds 224 to output via the speakers 204 based on the engine speed 212 and the engine torque 216. For example, the predetermined engine sounds 224 may include one or more predetermined engine sounds to be output at predetermined orders of a predetermined fundamental frequency (e.g., in Hertz) of the engine 102. The predetermined engine sounds 224 may also include one or more predetermined engine sounds to be output at or based on not corresponding to the engine speed 212. Predetermined engine sounds output at or based on frequencies other than the predetermined fundamental frequency of the engine 102 may be output, for example, to mask various vehicle sounds and/or for one or more other purposes.

The characteristics 220 at a given time may include, for example, one or more frequencies at which to output each of the one or more predetermined engine sounds 224. The frequencies may include, for example, frequencies corresponding to the predetermined fundamental frequency. For example only, the predetermined orders may include, but are not limited to, 0.5, 1, 1.5, 2, 2.5, 3, 3.5, 4, 4.5, 5, 5.5, 6, 6.5, 7, 7.5, and $8^{th}$ orders of the predetermined fundamental frequency of the engine 102. The predetermined orders, however, may include one or more other orders.

The characteristics 220 at the given time may also include respective magnitudes (e.g., in dB) for outputting each of the one or more predetermined engine sounds 224 at the respective frequencies. In other words, for each of the one or more predetermined engine sounds 224, the sound control module 208 may set: one or more frequencies at which to output that one of the predetermined engine sounds 224; and one or more magnitudes (for the one or more frequencies, respectively) for outputting that one of the predetermined engine sounds 224. Sound files of the predetermined engine sound(s) 224 (or tones) are stored in memory, such as in sound memory 228.

The sound control module 208 determines the magnitudes for outputting the predetermined engine sounds 224 at the predetermined orders of the predetermined fundamental frequency of the engine 102 based on the engine torque 216. For example, the sound control module 208 determines the magnitudes for outputting the predetermined engine sounds 224 using a lookup table of magnitudes for outputting the predetermined engine sounds 224 at the predetermined orders (of the predetermined fundamental frequency) indexed by engine torque. An example of one row of such a lookup table for one torque is provided below merely as an illustrative aid.

| | O | | | | | | | | | | |
|---|---|---|---|---|---|---|---|---|---|---|---|
| T | 0.5 | 1.0 | 1.5 | 2.0 | 2.5 | 3.0 | 3.5 | 4.0 | 4.5 | 5.0 | 5.5 . . . |
| T | M0.5 | M1 | M1.5 | M2 | M2.5 | M3 | M3.5 | M4 | M4.5 | M5 | M5.5 . . . |

The top row lists predetermined orders (O) of the predetermined fundamental frequency of the engine 102. For example, 0.5 corresponds to the 0.5th order of the predetermined fundamental frequency of the engine 102, 1.0 corresponds to the first order of the predetermined fundamental frequency of the engine 102, and so on. The bottom row lists, for the engine torque T, magnitudes (M) for the predetermined orders, respectively, at which to output one of the predetermined engine sounds 224.

The lookup table is calibrated, for example, based on engine operation with a calibrated intake temperature 252 and a calibrated exhaust temperature 256. Sound speed, however, varies as at least one of an intake air temperature 232 and an exhaust temperature 236 varies. As discussed further below, the sound control module 208 therefore adjusts the magnitudes for outputting the predetermined engine sounds 224 at the predetermined orders of the predetermined fundamental frequency of the engine 102 based on at least one of the intake air temperature 232 and the exhaust temperature 236.

The engine speed 212 may be measured using an engine speed sensor or determined (e.g., by an engine speed module of the ECM 114) based on changes in crankshaft position measured using the crankshaft position sensor 180 over a period between crankshaft positions. The engine torque 216 may be measured using a torque sensor or determined (e.g., by a torque estimation module of the ECM 114) based on one or more parameters using one or more equations and/or lookup tables that relate the parameter(s) to engine torque. As an example, the torque estimation module may determine the engine torque 216 using a torque relationship such as $$T=f(APC,S,I,E,AF,OT,\#),$$

where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may also be accounted for, such as the degree of opening of an exhaust gas recirculation (EGR) valve. This relationship may be modeled by an equation and/or may be stored as a lookup table. The torque estimation module may determine the APC based on measured MAF and the engine speed 212, for example, using one or more equations and/or lookup tables that relate MAF and engine speed to APC.

The intake air temperature 232 may be measured using a sensor (e.g., the IAT sensor 192) or determined based on one or more other parameters. For example, in a naturally aspirated (non-boosted) engine, the intake air temperature 232 may be measured using the IAT sensor 192 or a temperature sensor measuring temperature within the intake manifold 110. For boosted engines (e.g., including a turbocharger or a supercharger), a temperature module may determine the intake air temperature 232 based on an air temperature measured upstream of the boost device using a temperature sensor, an air temperature measured between the boost device and a cooler (e.g., charge air cooler or intercooler) using a temperature sensor, and an air temperature measured downstream of the cooler using a temperature sensor. The temperature module may determine the intake air temperature 232, for example, using one of an equation and a lookup table that relates these temperatures to intake air temperatures.

The exhaust temperature 236 may be measured using a sensor, such as an exhaust temperature sensor measuring a temperature of exhaust within an exhaust manifold or another location in the exhaust system 134. Alternatively, a temperature module may determine the exhaust temperature 236 within the exhaust manifold based on one or more other parameters. An example of determining an exhaust temperature within an exhaust manifold is described in commonly assigned U.S. patent application Ser. No. 12/316,022, filed on Dec. 9, 2008, now issued as U.S. Pat. No. 8,855,894, the disclosures of which are incorporated in their entirety.

An adjustment module 240 determines at least one of an intake temperature adjustment 244 and an exhaust temperature adjustment 248. The intake temperature adjustment 244 and the exhaust temperature adjustment 248 may be unitless values. The adjustment module 240 determines the intake temperature adjustment 244 based on the intake air temperature 232 and the calibrated intake temperature 252. The calibrated intake temperature 252 is stored in memory. The adjustment module 240 may determine the intake temperature adjustment 244 using one of an equation and a lookup table that relates intake air temperatures and calibrated intake temperatures to intake temperature adjustments (values). For example, the adjustment module 240 may set the intake temperature adjustment 244 based on or equal to $$\sqrt{\frac{TICal}{IT}},$$

where TICal is the calibrated intake temperature 252 (in absolute temperature, such as Kelvin or Rankine) and IT is the intake air temperature 232 (again in absolute temperature, such as Kelvin or Rankine). The adjustment module 240 may convert the intake air temperature 232 and the calibrated intake temperature 252 to absolute temperature (such as Kelvin or Rankine) if the intake air temperature 232 and the calibrated intake temperature 252 are not already absolute temperatures, such as in degrees Celsius or degrees Fahrenheit.

The adjustment module 240 determines the exhaust temperature adjustment 248 based on the exhaust temperature 236 and the calibrated exhaust temperature 256. The calibrated exhaust temperature 256 is stored in memory. The adjustment module 240 may determine the exhaust temperature adjustment 248 using one of an equation and a lookup table that relates exhaust temperatures and calibrated exhaust temperatures to exhaust temperature adjustments (values). For example, the adjustment module 240 may set the exhaust temperature adjustment 248 based on or equal to $$\sqrt{\frac{TECal}{ET}},$$

where TECal is the calibrated exhaust temperature 256 (in absolute temperature, such as Kelvin or Rankine) and ET is the exhaust temperature 236 (again in absolute temperature, such as Kelvin or Rankine). The adjustment module 240 may convert the exhaust temperature 236 and the calibrated exhaust temperature 256 to absolute temperature (such as Kelvin or Rankine) if the exhaust temperature 236 and the calibrated exhaust temperature 256 are not already absolute temperatures, such as in degrees Celsius or degrees Fahrenheit.

In various implementations, the adjustment module 240 may determine the exhaust temperature adjustment 248 further based on a calibrated sound wavelength and a present sound wavelength. The calibrated sound wavelength may be stored in memory and corresponds to a sound wavelength during the calibration of the lookup table of magnitudes for the calibrated exhaust temperature 256. The present sound wavelength may be determined by the adjustment module 240, for example, based on the exhaust temperature 236. For example, the adjustment module 240 may determine the present sound wavelength using one of an equation and a lookup table that relates exhaust temperatures to present sound wavelengths. For example, the adjustment module 240 may set the exhaust temperature adjustment 248 based on or equal to $$\sqrt{\frac{\gamma 1 * TECal}{\gamma 2 * ET}},$$

where $\gamma 1$ is the calibrated sound wavelength and $\gamma 2$ is the present sound wavelength.

An adjusting module 260 adjusts the engine speed 212 based on at least one of the intake temperature adjustment 244 and the exhaust temperature adjustment 248 to produce at least one of an intake engine speed 264 (a first adjusted engine speed) and an exhaust engine speed 268 (a second adjusted engine speed), respectively. The adjusting module 260 determines the intake engine speed 264 based on the engine speed 212 and the intake temperature adjustment 244. The adjusting module 260 determines the intake engine speed 264 using one of an equation and a lookup table that relates engine speeds and intake temperature adjustments to intake engine speeds. For example, the adjusting module 260 may set the intake engine speed 264 based on or equal to the engine speed 212 multiplied by the intake temperature adjustment 244.

The adjusting module 260 determines the exhaust engine speed 268 based on the engine speed 212 and the exhaust temperature adjustment 248. The adjusting module 260 determines the exhaust engine speed 268 using one of an equation and a lookup table that relates engine speeds and exhaust temperature adjustments to exhaust engine speeds. For example, the adjusting module 260 may set the exhaust engine speed 268 based on or equal to the engine speed 212 multiplied by the exhaust temperature adjustment 248.

A magnitude adjustment module 272 determines magnitude adjustments 276 (e.g., in dB) for the respective predetermined orders of the predetermined fundamental frequency of the engine 102 based on at least one of the intake engine speed 264 and the exhaust engine speed 268. The magnitude adjustments 276 include respective adjustments (values) for the magnitudes determined based on the engine torque 216 for the respective predetermined orders.

For example, the magnitude adjustment module 272 may determine the magnitude adjustments 276 based on the intake engine speed 264 using a lookup table that relates engine speeds (such as the intake engine speed 264) to magnitude adjustments for the predetermined orders, respectively. An example of one row of such a lookup table for one engine speed is provided below merely as an illustrative aid.

| | O | | | | | | | | | | |
|---|---|---|---|---|---|---|---|---|---|---|---|
| RPM | 0.5 | 1.0 | 1.5 | 2.0 | 2.5 | 3.0 | 3.5 | 4.0 | 4.5 | 5.0 | 5.5 . . . |
| RPM1 | MA0.5 | MA1 | MA1.5 | MA2 | MA2.5 | MA3 | MA3.5 | MA4 | MA4.5 | MA5 | MA5.5 . . . |

The top row lists predetermined orders (O) of the predetermined fundamental frequency of the engine 102. For example, 0.5 corresponds to the 0.5th order of the predetermined fundamental frequency of the engine 102, 1.0 corresponds to the first order of the predetermined fundamental frequency of the engine 102, and so on. The bottom row lists, for the engine speed (RPM1), magnitude adjustments (MA) for the predetermined orders, respectively, at which to output one of the predetermined engine sounds 224. As discussed further below, the sound control module 208 adjusts the magnitudes for the respective orders of the predetermined fundamental frequency of the engine 102 based on the magnitude adjustments 276, respectively.

Additionally or alternatively, the magnitude adjustment module 272 may determine the magnitude adjustments 276 based on the exhaust engine speed 268 using a lookup table that relates engine speeds (such as the exhaust engine speed 268) to magnitude adjustments for the predetermined orders, respectively. An example of one row of such a lookup table for one engine speed is provided below merely as an illustrative aid.

| | O | | | | | | | | | | | |
|---|---|---|---|---|---|---|---|---|---|---|---|---|
| RPM | 0.5 | 1.0 | 1.5 | 2.0 | 2.5 | 3.0 | 3.5 | 4.0 | 4.5 | 5.0 | 5.5 | . . . |
| RPM1 | MA0.5 | MA1 | MA1.5 | MA2 | MA2.5 | MA3 | MA3.5 | MA4 | MA4.5 | MA5 | MA5.5 | . . . |

The top row lists predetermined order (O) of the frequency corresponding to the engine speed 212. For example, 0.5 corresponds to the 0.5th order of the predetermined fundamental frequency of the engine 102, 1.0 corresponds to the first order of the predetermined fundamental frequency of the engine 102, and so on. The bottom row lists, for the engine speed (RPM1), magnitude adjustments (MA) for the predetermined orders, respectively, at which to output one of the predetermined engine sounds 224.

The example of the magnitude adjustment module 272 determining the magnitude adjustments 276 based on both the intake engine speed 264 and the exhaust engine speed 268 will now be discussed. In this example, the magnitude adjustment module 272 may determine first magnitude adjustments for the respective orders based on the intake engine speed 264 using a first lookup table, as described above. The magnitude adjustment module 272 may also determine second magnitude adjustments for the respective orders based on the exhaust engine speed 2687 using a second lookup table, as also described above. The magnitude adjustment module 272 may set the magnitude adjustments 276, for example, based on or equal to an average of the first and second magnitude adjustments, respectively.

As discussed above, the sound control module 208 determines the magnitudes for the respective predetermined orders of the predetermined fundamental frequency of the engine 102 based on the engine torque 216. The sound control module 208 adjusts the magnitudes for the respective predetermined orders based on the magnitude adjustments for the respective orders, respectively.

For example, the sound control module 208 may set adjusted magnitudes for the respective predetermined orders based on or equal to the magnitudes plus the magnitude adjustments, respectively. As an example, the sound control module 208 may set the adjusted magnitude for the 0.5th order of the predetermined fundamental frequency based on or equal to the magnitude determined for the 0.5th order of the predetermined fundamental frequency (based on the engine torque 216) plus the magnitude adjustment determined for the 0.5th order of the predetermined fundamental frequency (based on at least one of the intake engine speed and the exhaust engine speed). This is performed similarly to determine the adjusted magnitude for each of the predetermined orders. In various implementations, subtraction, multiplication, or another function may be used. The sound control module 208 includes the adjusted magnitudes in the characteristics 220.

An audio driver module 280 receives the characteristics 220 and the predetermined engine sound(s) 224. The audio driver module 280 applies power (e.g., from the one or more other batteries) to the speakers 204 to output the predetermined engine sound(s) 224 at the respective frequencies and magnitudes specified by the sound control module 208. As discussed above, the magnitudes for the predetermined orders, respectively, of the predetermined fundamental frequency of the engine 102 are adjusted based on at least one of the intake air temperature 232 and the exhaust temperature 236.

Adjusting the magnitudes of the sound output based on the intake air temperature 232 and/or the exhaust temperature 236 corrects the sound output to account for differences between sound speed at the intake and/or exhaust temperatures relative to sound speed at the calibrated intake and/or exhaust temperatures 252 and 256. This may improve user experience provided by outputting the predetermined engine sounds 224. Herein, in the example use of lookup tables, interpolation, such as linear interpolation, may be used to determine an output value when an input value falls between input value entries of a lookup table.

Figure 3:
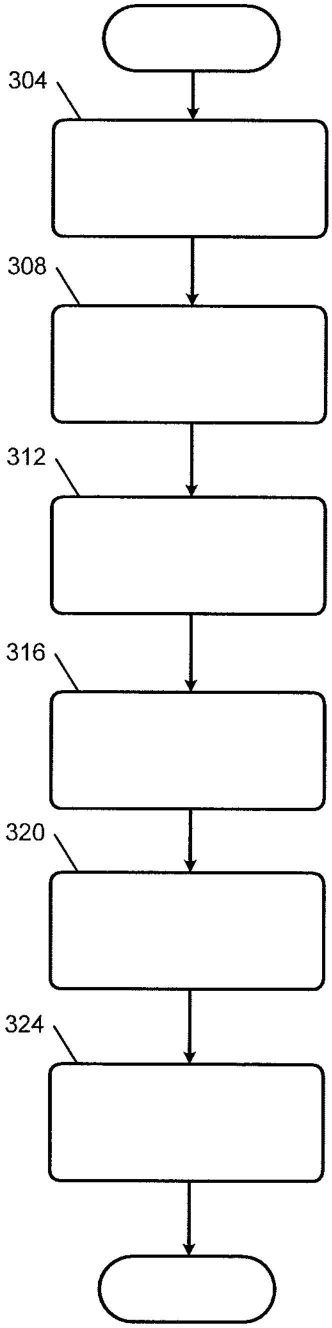
FIG. 3 is a flowchart depicting an example method of outputting engine sound based on intake and/or exhaust temperature.

FIG. 3 is a flowchart depicting an example method of outputting predetermined engine sound based on intake air temperature and/or exhaust temperature. Control may begin with 304 where the adjustment module 240 determines at least one of the intake temperature adjustment 244 and the exhaust temperature adjustment 248. The adjustment module 240 determines the intake temperature adjustment 244 based on a ratio of the intake air temperature 232 to the calibrated intake temperature 252. The adjustment module determines the exhaust temperature adjustment 248 based on a ratio of the exhaust temperature 236 to the calibrated exhaust temperature 256.

At 308, the adjusting module 260 adjusts the engine speed 212 to determine at least one of the intake engine speed 264 and the exhaust engine speed 268. The adjusting module 260 determines the intake engine speed 264 based on the engine speed 212 and the intake temperature adjustment 244. The adjusting module 260 determines the exhaust engine speed 268 based on the engine speed 212 and the exhaust temperature adjustment 248.

At 312, the sound control module 208 determines the frequencies for outputting one of the predetermined engine sounds 224 based on the engine speed 212. More specifically, the sound control module 208 determines the frequencies for outputting the one of the predetermined engine sounds 224 based on the predetermined orders of the predetermined fundamental frequency of the engine 102. The sound control module 208 also determines the magnitudes for outputting the one of the predetermined engine sounds 224 at the frequencies, respectively. The sound control module 208 determines the magnitudes based on the engine torque 216 using the lookup table that relates engine torques to magnitudes for the predetermined orders, respectively. The lookup table is calibrated based on at least one of the calibrated intake temperature 252 and the calibrated exhaust temperature 256.

At 316, the magnitude adjustment module 272 determines the magnitude adjustments 276 for the magnitudes at the frequencies, respectively. The magnitude adjustment module 272 determines the magnitude adjustments 276 based on at least one of the intake engine speed 264 and the exhaust engine speed 268. For example, the magnitude adjustment module 272 may determine the magnitude adjustments 276 using one or more lookup tables that relate engine speeds (e.g., the intake engine speed 264 and the exhaust engine speed 268) to magnitude adjustment values for outputting the one of the predetermined engine sounds 224 at the predetermined orders, respectively.

The sound control module 208 adjusts the magnitudes (determined at 312) for the frequencies based on the magnitude adjustments 276 for the frequencies, respectively, at 320. The sound control module 208 may, for example, sum the magnitudes with the magnitude adjustments for the frequencies, respectively. For example, the sound control module 208 may sum the magnitude for a first one of the predetermined orders with the magnitude adjustment value for the first one of the predetermined orders. The sound control module 208 may sum the magnitude for a second one of the predetermined orders with the magnitude adjustment value for the second one of the predetermined orders, and so on for each of the predetermined orders for the one of the predetermined engine sounds 224.

At 324, the audio driver module 280 applies electrical power to the speakers 204 to output the one of the predetermined engine sounds 224 at the frequencies and the adjusted magnitudes at the frequencies, respectively. The one of the predetermined engine sounds 224 is therefore output at the frequencies and adjusted magnitudes, respectively. Being based on at least one of the intake air temperature 232 and the exhaust temperature 236, the output sound is compensated for sound speed in at least one of the intake system and the exhaust system and may improve user experience. While the example of FIG. 3 is shown as ending, FIG. 3 is illustrative of one control loop and control loops may be initiated at a predetermined rate. Also, FIG. 3 may be performed for more than one of the predetermined engine sounds 224 to be output. The audio driver module 280 may also output one or more other sounds, such as predetermined masking sounds, while outputting the predetermined engine sounds 224.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including “connected,” “engaged,” “coupled,” “adjacent,” “next to,” “on top of,” “above,” “below,” and “disposed.” Unless explicitly described as being “direct,” when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean “at least one of A, at least one of B, and at least one of C.”

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term “module” or the term “controller” may be replaced with the term “circuit.” The term “module” may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An audio control system of a vehicle, comprising:

a sound control module configured to determine N magnitudes for outputting a predetermined engine sound at N frequencies, respectively, using a lookup table calibrated based on at least one of a predetermined intake air temperature and a predetermined exhaust temperature, wherein N is an integer greater than one; and an adjustment module configured to at least one of:

determine a first adjustment value based on an intake air temperature and the predetermined intake air temperature; and determine a second adjustment value based on an exhaust temperature and the predetermined exhaust temperature; and an adjusting module configured to at least one of:

determine a first adjusted engine speed based on an engine speed and the first adjustment value; and determine a second adjusted engine speed based on the engine speed and the second adjustment value;

a magnitude adjustment module configured to determine at least one of N magnitude adjustment values for the N frequencies, respectively, based on at least one of:

the first adjusted engine speed; and the second adjusted engine speed, wherein the sound control module is further configured to determine N adjusted magnitudes for the predetermined engine sound at the N frequencies based on:

the N magnitudes for the N frequencies, respectively; and the N magnitude adjustment values for the N frequencies, respectively; and an audio driver module configured to apply power to at least one speaker of the vehicle and output the predetermined engine sound at the N frequencies and the N adjusted magnitudes for the N frequencies, respectively.

2. The audio control system of claim 1 wherein the sound control module is configured to determine the N magnitudes for the N frequencies, respectively, based on an engine torque output and using the lookup table, wherein the lookup table includes magnitudes for N predetermined orders, respectively, of a base frequency indexed as a function of engine torque output.

3. The audio control system of claim 2 wherein the base frequency is a predetermined fundamental frequency of the engine.

4. The audio control system of claim 1 wherein the sound control module is configured to set the N adjusted magnitudes for the N frequencies based on sums of:

the N magnitudes for the N frequencies, respectively; and the N magnitude adjustment values for the N frequencies, respectively.

5. The audio control system of claim 1 wherein the adjusting module is configured to at least one of:

set the first adjusted engine speed based on the engine speed multiplied by the first adjustment value; and set the second adjusted engine speed based on the engine speed multiplied by the second adjustment value.

6. The audio control system of claim 1 wherein the sound control module is configured to determine the N magnitudes for the N frequencies, respectively, based on a torque output of the engine.

7. The audio control system of claim 1 wherein the N frequencies include N predetermined orders of a predetermined fundamental frequency of the engine.

8. The audio control system of claim 1 wherein the adjustment module is configured to at least one of:

(i) determine the first adjustment value based on a first ratio of the intake air temperature to the predetermined intake air temperature; and (ii) determine the second adjustment value based on a second ratio of the exhaust temperature to the predetermined exhaust temperature.

9. An audio control method for a vehicle, comprising:

determining N magnitudes for outputting a predetermined engine sound at N frequencies, respectively, using a lookup table calibrated based on at least one of a predetermined intake air temperature and a predetermined exhaust temperature, wherein N is an integer greater than one;

at least one of:

determining a first adjustment value based on an intake air temperature and the predetermined intake air temperature; and determining a second adjustment value based on an exhaust temperature and the predetermined exhaust temperature;

at least one of:

determining a first adjusted engine speed based on an engine speed and the first adjustment value; and determining a second adjusted engine speed based on the engine speed and the second adjustment value;

determining at least one of N magnitude adjustment values for the N frequencies, respectively, based on at least one of:

the first adjusted engine speed; and the second adjusted engine speed;

determining N adjusted magnitudes for the predetermined engine sound at the N frequencies based on:

the N magnitudes for the N frequencies, respectively; and the N magnitude adjustment values for the N frequencies, respectively; and applying power to at least one speaker of the vehicle and outputting the predetermined engine sound at the N frequencies and the N adjusted magnitudes for the N frequencies, respectively.

10. The audio control method of claim 9 wherein:

determining the N magnitudes includes determining the N magnitudes for the N frequencies, respectively, based on an engine torque output and using the lookup table; and the lookup table includes magnitudes for N predetermined orders, respectively, of a base frequency indexed as a function of engine torque output.

11. The audio control method of claim 10 wherein the base frequency is a predetermined fundamental frequency of the engine.

12. The audio control method of claim 9 wherein determining the N adjusted magnitudes includes setting the N adjusted magnitudes for the N frequencies based on sums of:

the N magnitudes for the N frequencies, respectively; and the N magnitude adjustment values for the N frequencies, respectively.

13. The audio control method of claim 9 wherein at least one of:

determining the first adjusted engine speed includes setting the first adjusted engine speed based on the engine speed multiplied by the first adjustment value; and determining the second adjusted engine speed includes setting the second adjusted engine speed based on the engine speed multiplied by the second adjustment value.

14. The audio control method of claim 9 wherein determining the N magnitudes includes determining the N magnitudes for the N frequencies, respectively, based on a torque output of the engine.

15. The audio control method of claim 9 wherein the N frequencies include N predetermined orders of a predetermined fundamental frequency of the engine.

16. The audio control method of claim 9 wherein the at least one of determining the first adjustment value and determining the second adjustment value includes at least one of:

(i) determining the first adjustment value based on a first ratio of the intake air temperature to the predetermined intake air temperature; and (ii) determining the second adjustment value based on a second ratio of the exhaust temperature to the predetermined exhaust temperature.

17. The audio control method of claim 9 wherein:

the at least one of determining the first adjustment value and determining the second adjustment value includes determining the second adjustment value based on the exhaust temperature and the predetermined exhaust temperature;

the at least one of determining the first adjusted engine speed and the second adjusted engine speed includes determining the second adjusted engine speed based on the engine speed and the second adjustment value; and the determining the at least one of N magnitude adjustment values includes determining the at least one of N magnitude adjustment values for the N frequencies, respectively, based on the second adjusted engine speed.

18. The audio control system of claim 1, wherein:

the sound control module is configured to determine N magnitudes for outputting a predetermined engine sound at N frequencies, respectively, using a lookup table calibrated based on the predetermined exhaust temperature;

the adjustment module is configured to determine the second adjustment value based on the exhaust temperature and the predetermined exhaust temperature; and the adjusting module is configured to determine the second adjusted engine speed based on the engine speed and the second adjustment value; and the magnitude adjustment module is configured to determine the at least one of the N magnitude adjustment values for the N frequencies, respectively, based on the second adjusted engine speed.

* * * * *